United States Patent
Gleiter et al.

(10) Patent No.: US 6,751,083 B1
(45) Date of Patent: Jun. 15, 2004

(54) DEVICE WITH AN ELECTRODE, A SPONGIFORM PERMEABLE LAYER, AN ELECTROLYTE AND A MEANS FOR APPLYING A VOLTAGE

(75) Inventors: Herbert Gleiter, Karlsruhe (DE); Olaf Wollersheim, Stutensee (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 260 days.

(21) Appl. No.: 10/111,847

(22) PCT Filed: Oct. 13, 2000

(86) PCT No.: PCT/EP00/10079

§ 371 (c)(1),
(2), (4) Date: Apr. 30, 2002

(87) PCT Pub. No.: WO01/33590

PCT Pub. Date: May 10, 2001

(30) Foreign Application Priority Data

Oct. 30, 1999 (DE) .......................... 199 52 447

(51) Int. Cl.$^7$ .................................. H01G 9/00
(52) U.S. Cl. ................ 361/434; 174/250; 174/258
(58) Field of Search ................ 174/250, 255, 174/256, 258; 216/41; 313/309; 361/434, 500

(56) References Cited

U.S. PATENT DOCUMENTS

2003/0042226 A1 * 3/2003 Coll et al. .................. 216/41
2003/0042834 A1 * 3/2003 Dean et al. ................. 313/309

FOREIGN PATENT DOCUMENTS

WO    WO 94 00887 A    1/1994

OTHER PUBLICATIONS

V. Srinvasen, et al.: "An electrochemical route for making porous nickel oxide electrochemical capacitors", J. Electromchem. Soc., Bd. 144, Nr. 8, Aug. 1997), pp. 1210–1213.

Kuo–Chuan, et al.: "Porous nickel oxide/nickel films for electrochemical capacitors", J. Electrochem Soc., Bd. 143, Nr. 1, Jan. 1996; pp. 124–130.

* cited by examiner

Primary Examiner—Evan Pert
Assistant Examiner—Jeremy Norris
(74) Attorney, Agent, or Firm—Venable LLP; Robert Kinberg

(57) ABSTRACT

An apparatus having a percolating, sponge-like nanoparticulate layer, the apparatus being suitable for numerous technical applications. The object is accomplished by an apparatus having an electrode and a sponge-like, percolating, electrically-conductive layer comprising bound nanoparticles, the layer containing cavities and at least partially covering the electrode. The size of the nanoparticles is at most 15 times the size of a forming space-charge region in the layer; the cavities in the layer are at least partially filled with an electrolyte. The cavities of the layer are larger than the space-charge region in the electrolyte. The electrolyte also forms a film, which borders the surface of the layer located opposite the electrode. The apparatus also includes elements with which a voltage can be applied between the electrode and the electrolyte.

2 Claims, No Drawings

DEVICE WITH AN ELECTRODE, A SPONGIFORM PERMEABLE LAYER, AN ELECTROLYTE AND A MEANS FOR APPLYING A VOLTAGE

The invention relates to an apparatus having an electrode, a sponge-like, percolating layer, an electrolyte and an element for applying a voltage, as defined in the first claim.

In the publication "Porous Nickel Oxide/Nickel Films for Electrochemical Capacitors," J. Electrochem. Soc., Vol. 143 (1996), pp. 124–130, Kuo-chan Liu and Marc A. Anderson report on electrochemical capacitors. The capacitors comprise two layers that are spaced from one another by 7 mm and are made of percolating, sponge-like NiO/Ni particles, which are applied to a carrier and are 3 to 8 nm in size, with a pore size of 2 to 3 nm. The layers are disposed in an electrochemical cell that is filled with a liquid electrolyte. A first circuit, in which the cell and a resistor are connected in series, charges the capacitor via a potentiostat. The discharge is effected by bridging the potentiostat. A method for producing the layer is disclosed.

Because the two provided percolating layers are separated from one another by a 7 mm-thick layer of the liquid electrolyte, their use is limited to capacitors. Other applications, particularly those based on optical effects, are precluded. The nature of the interaction between the percolating layers and the liquid electrolyte is not described exactly; in particular, it is not mentioned whether the liquid electrolyte penetrates the layers.

"An Electrochemical Route for Making Porous Nickel Oxide Electrochemical Capacitors" by Venkat Srinivasan and John W. Weidner, J. Electrochem. Soc., Vol. 144 (1997), L210–L213, describes a further production method.

It is the object of the invention to propose an apparatus having a percolating, sponge-like nanoparticulate layer, the apparatus being suitable for numerous technical applications.

The object is accomplished by the apparatus described in claim 1. The further claims disclose preferred embodiments of the apparatus.

In accordance with the invention, an apparatus is proposed that is constructed on an electrode as the carrier. Suitable electrodes include solid bodies, films or coatings comprising a highly conductive and chemically inert metal, such as silver, aluminum, nickel, gold, platinum or copper, or a transparent conductive layer, such as ITO (Indium Tin Oxide). The film is preferably 0.1 to 1000 $\mu$m thick. Small film thicknesses, e.g., in the order of magnitude of 1 $\mu$m, are used for electronic displays; thicker films are used in actuator technology.

The electrode is at least partially covered by a sponge-like, percolating layer comprising bound nanoparticles. "Percolating" is used here and hereinafter to refer to a structure that is connected mechanically, and in an electrically conductive manner, in its entirety. Preferably, only a single percolating layer is provided. The nanoparticles can comprise a metal such as silver, gold, palladium, platinum, nickel or tungsten, a semiconductor such as silicon, gallium arsenide or cadmium sulfide, or an ionic crystal such as nickel oxide or ruthenium oxide.

The maximum size of the nanoparticles is 15 times the size of a forming space-charge region. The term "space-charge region" is defined and explained in, for example, K. H. Hellwege, Einführung in die Festkörperphysik [Introduction to Solid Electrolyte Physics], Springer 1976, Ch. 46.2, and Ch. Kittel, Einführung in die Festk örperphysik, Oldenbourg, $10^{th}$ Ed., 1993, "Schottky Barriers" section. In metals, the space-charge region is about 0.1 nm. Metal nanoparticles should therefore ideally be about 1.5 nm. In semiconductors, the space-charge region is between a few and a few hundred nm, depending on the doping. Thus, semiconductor nanoparticles should be about 15 to 3000 nm.

The size of the cavities or pores in the sponge-like, percolating layer must at least correspond to the space-charge region in the electrolyte. They can otherwise be of arbitrary size. To achieve an optimum packing density, the size of the cavities is selected to be only slightly greater than the size of the space-charge region, or about twice the size of the space-charge region at most.

The cavities of the layer are at least partially filled with an electrolyte. The electrolyte can be a solid or liquid electrolyte, such as a salt solution. The cavities should preferably be filled as full as possible with the electrolyte. Complete filling ensures that the same charge in the space-charge region in the metal or semiconductor is also distributed in the typical space-charge region of the electrolyte.

A film of the electrolyte also borders the free surface of the percolating layer that is not located on the electrode. This film can be applied directly to the layer; alternately, a thin, e.g., 0.1 to 10 nm-thick, layer of an insulating material can be provided between the layer and the film. In both cases, the film thickness should be about 1 to 1000 $\mu$m.

Finally, the apparatus includes an element that can be used to apply a voltage between the electrode and the electrolyte. The voltage should be a few Volts, preferably from 1 to 3 Volts. Voltages of over 10 V are usually not necessary.

In this apparatus, an applied voltage causes electrons to leave the conductivity band of the metal or semiconductor, which forms the sponge-like, percolating layer, and enter the electrolyte. Because of the nanostructure of the sponge-like layer, the overwhelming majority of atoms of this layer are located on easily accessible surfaces, so up to 30% of the atoms of the layers can donate electrons. The attained effect can be utilized in numerous ways.

For example, optical properties can be altered through the application and shutoff of the voltage. The apparatus can therefore be used as a color or black-and-white, large-surface display, for light dimming control, for automatic brightness adaptation in offices or workrooms, or as a rapid optical modulator. The aforementioned effect also alters mechanical properties, so the apparatus can be used as an actuator or a control element with a volume-expansion effect. It is also conceivable to utilize phase transformations occurring with this effect.

The sponge-like, percolating layer can be produced with numerous methods. Possible production methods include:

a) gas-phase condensation, in which the metal or the semiconductor is vaporized in a vacuum recipient filled with an inert gas at a certain partial pressure. With suitably selected method parameters, the network of the sponge-like layer is formed through the collection of the resulting nanoparticles on a cooled substrate;

b) leaching from a mixed crystal or a multiple-phase glass. This process employs a spinodal separation of an ionic crystal in two phases, e.g., a calcium-rich phase and a barium-rich phase. These two phases are structured in a sponge-like manner as described above. Because of the varying solubility, one of the two phases can be dissolved out in suitable solvents, so the entire network is obtained;

c) electrochemical separation. Under suitable separation conditions, metals are deposited in a sponge-like layer onto an electrode.

What is claimed is:

1. An apparatus
   a) having an electrode;
   b) having a sponge-like, percolating, electrically-conductive layer, which comprises connected nanoparticles and contains cavities, and at least partially covers the electrode, with the size of the nanoparticles being at most 15 times the size of a space-charge region forming in the layer;
   c) in which the cavities of the layer are at least partially filled with an electrolyte, and are larger than the space-charge region in the electrolyte; and
   d) in which the electrolyte also forms a film that borders the surface of the layer located opposite the electrode; and
   e) having elements with which a voltage can be applied between the electrode and the electrolyte.

2. The apparatus according to claim 1, in which a layer of insulating material is provided between the layer and the film formed by the electrolyte.

* * * * *